US012555525B2

(12) United States Patent
Willem et al.

(10) Patent No.: US 12,555,525 B2
(45) Date of Patent: Feb. 17, 2026

(54) DRIVER CIRCUIT FOR LIGHT EMITTING MODULES WITH COMBINED ACTIVE AND PASSIVE MATRIX FUNCTIONALITIES

(71) Applicant: BARCO N.V., Kortrijk (BE)

(72) Inventors: Patrick Willem, Ostend (BE); Bart Van Den Bossche, Marke (BE); Peter Gerets, Roeselare (BE); Wim Van Eessen, Kruishoutem (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 18/572,232

(22) PCT Filed: Jun. 30, 2022

(86) PCT No.: PCT/EP2022/068038
§ 371 (c)(1),
(2) Date: Dec. 20, 2023

(87) PCT Pub. No.: WO2023/275229
PCT Pub. Date: Jan. 5, 2023

(65) Prior Publication Data
US 2024/0371320 A1 Nov. 7, 2024

(51) Int. Cl.
*G09G 3/3216* (2016.01)
*G09G 3/32* (2016.01)

(52) U.S. Cl.
CPC ............. *G09G 3/3216* (2013.01); *G09G 3/32* (2013.01); *G09G 2300/026* (2013.01)

(58) Field of Classification Search
CPC ...... G09G 3/3216; G09G 3/32; G09G 3/2014; G09G 2310/0297; G09G 2300/026
See application file for complete search history.

(56) References Cited

U.S. PATENT DOCUMENTS 5,696,529 A * 12/1997 Evanicky ............. G03B 21/132 349/5
7,071,894 B1 7/2006 Thielemans et al.
7,176,861 B2 2/2007 Dedene et al.
7,450,085 B2 11/2008 Thielemans et al.
7,972,032 B2 7/2011 Meersman et al.
(Continued)

FOREIGN PATENT DOCUMENTS

WO 2019185935 10/2019

OTHER PUBLICATIONS

ISR and Written Opinion for PCT/EP2022/068038 dated Oct. 20, 2022 (16 pages).

*Primary Examiner* — Lunyi Lao
(74) *Attorney, Agent, or Firm* — HSML P.C.

(57) ABSTRACT

A driver circuit for driving a matrix of N×M pixels of a light emitting module. Each pixel is composed of at least three types of light emitting elements. The light emitting elements are driven by a modulation control signal. The driver circuit is embedded in a TFT layer. It is configured to cooperate with N multiplexers provided in an external driver circuit, each multiplexer being configured to drive one line of M pixels. It is also configured to cooperate with one external current source per type of light emitting element, each external current source being mirrored M times on the matrix of the driver circuit and being arranged in series with a signal switch for generating the control signal provided for each of the M columns.

19 Claims, 5 Drawing Sheets

(56) References Cited

U.S. PATENT DOCUMENTS

| | | | | |
|---|---|---|---|---|
| 9,324,773 | B2 * | 4/2016 | Fujii | H10K 50/8426 |
| 9,349,314 | B2 * | 5/2016 | Park | G09G 3/3233 |
| 10,832,615 | B2 * | 11/2020 | Kim | G09G 3/2014 |
| 11,132,940 | B2 * | 9/2021 | Yen | G09G 3/2003 |
| 11,250,777 | B2 * | 2/2022 | Hudson | G09G 3/3233 |
| 2005/0104823 | A1 * | 5/2005 | Giraldo | G09G 3/3216 345/87 |
| 2006/0186822 | A1 * | 8/2006 | Park | G09G 3/3233 345/44 |
| 2010/0295760 | A1 * | 11/2010 | Somerville | G09G 3/3216 345/82 |
| 2010/0295860 | A1 * | 11/2010 | Somerville | G09G 3/3216 345/545 |
| 2015/0123101 | A1 * | 5/2015 | Fujii | H10K 59/127 257/40 |
| 2019/0371232 | A1 * | 12/2019 | Kim | H01L 25/167 |
| 2020/0312233 | A1 * | 10/2020 | Yen | G09G 3/3266 |
| 2021/0090493 | A1 * | 3/2021 | Hudson | G09G 3/3241 |

* cited by examiner

DRIVER CIRCUIT FOR LIGHT EMITTING MODULES WITH COMBINED ACTIVE AND PASSIVE MATRIX FUNCTIONALITIES

TECHNICAL FIELD

The present disclosure relates to the field of driver circuits for light emitting elements of a light emitting module, chips for such driver circuits and light emitting modules.

BACKGROUND

It is a current tendency to progress towards light emitting elements having a smaller size to improve today's displays resolution. It has become a new trend to build displays with for example micro-LEDs (μLEDs).

The use of micro-LEDs (μLEDs) in LED display technology brings about new challenges to be solved. μLEDs have, as indicated in their name, a micrometer-size scale. Accordingly, they also require micrometer-size scale contacting methods.

Currently, a lot of novel systems are under investigation as traditional contacting methods, such as soldering, gluing, are not possible with μLEDs, especially since these materials need to be precisely applied on the target by either reflow stencil (limited in aperture and positioning tolerances) or XY dispensing equipment (limited in volume and XY positioning accuracy during dispensing).

Furthermore, due to the small contact pads, the μLED architecture cannot be based on PCB anymore. In fact, the use of PCB restricts the dimensions of the wires to a size which is even larger than the LEDs themselves. The industrial manufacturing process has limitations. The substrates need to be lithographically defined (conf. LCD, OLED, silicon chips, etc.) and comprises single-sided contacts and processing due to the process technology (e.g., TFT LTPS technology).

Currently, most LED displays are driven by passive matrix drivers, located on the backside of the LED panels, to keep the distance between the chip and the LED as small as possible and thereby avoid performance reduction due to parasitic effects. PM has the advantage that the PWM is generated in driver chips with time-multiplexed driving of groups of LEDs, sharing the same current source.

Since the technology of μLEDs will be preferably TFT single side based, this is not possible anymore. AM has the advantage of integrating active components in the display substrate and sample-and-hold the incoming data by means of a scanline to the individual pixels. To generate PWM driven constant current, extra TFTs are needed in the pixels, which usually do not fit the available area in the active matrix.

There is thus a need for improvement in the art.

SUMMARY

Aspects of the present disclosure relate to a driver circuit for driving a matrix of N×M pixels of a light emitting module, wherein each pixel is composed of at least three types of light emitting elements. The light emitting elements being driven by a modulation control signal of period T configured to switch the light emitting elements on and off at most during 1/Nth of the period T, wherein the period T corresponds to the duration of a frame. The driver circuit is embedded in a TFT layer such that a switch is embedded in each light emitting element. The driver circuit is also configured to cooperate with N multiplexers provided in an external driver circuit, each multiplexer being configured to drive one line of M pixels of the matrix, and the combination of multiplexers is configured to address all the pixels of the N×M matrix during one period of the control signal. Each pixel of a group of M pixels is shown consecutively during at most 1/Nth of the period T. The driver circuit is also configured to cooperate with at least one external current source per type of light emitting element to drive the N×M matrix. Each external current source is mirrored M times on the TFT layer of the driver circuit and is arranged in series with a switch for generating the control signal provided for each of the M columns of the matrix.

A matrix of N×M pixels shares common functionalities, which allows to gain space for each pixel. The numbers of N and M pixels can be decided based on a trade-off, depending on the type of application and the requirements of space, data to transfer, etc. In fact, N determines the number of multiplexers for the time division multiplexing. This will also have an impact on visual artefacts which may appear on the display. M determines the maximum intensity of the current to provide the desired maximum signal.

A current source is provided for each type of sub-pixel, or for each color, as each color is to be driven independently of the others to be able to achieve the desired white point of the display. The functionalities provided by the TFT can be shared among multiple pixels.

The current sources and the PWM transistor are shared, instead of being individual as in a classic active matrix driving scheme. It is also an advantage that some functionalities remain on the active matrix, i.e., the current mirrors and the PWM switch.

As TFT is not an ideal conductor, it is preferable to implement the multiplexers on an external driver circuit.

The control signal is preferably a pulse width modulation signal, and the control signal switch is a pulse width modulation switch.

Pulse with modulation permits to reduce the average power delivered by an electrical signal, reduce power losses while being able to provide a signal with sufficient bit depth.

Other types of signals can also be implemented, such as Pulse Amplitude Modulation, PAM. The control signal switch is then adapted to PAM driving.

Preferably, the three types of light emitting elements emit a different color, wherein the different colors are at least red, green, and blue. The desired white point can thereby be achieved. In addition, it is possible to provide an additional light emitting element per pixel, for example red, green or blue, such that each pixel comprises two distinct light emitting elements and two identical ones. This can be beneficial for implementing for example a Bayern pattern. An additional current source would then be provided for the additional light emitting element per pixel.

The multiplexers are preferably provided in a PCB arranged under of the matrix. They can be connected by side connections, such as a side flexible PCB for example.

The multiplexers can be transistors provided by a low Rds(on) FET.

In fact, TFT is not an ideal conductive material. Such an implementation of transistors outside of the TFT has the advantage that there is no voltage drop on the TFT, and thereby the appearance of hot spots is avoided. In addition, this implementation results in very low power losses, and heat dissipation.

If it were implemented on the TFT, all the currents would go through the cathode side of the diodes, through one transistor and since the transistor is not an ideal transistor, this would result in a high voltage drop over the switching transistor and result in heat generation on the TFT, which may further result in the appearance of hot spots.

Each multiplexer may also be configured to drive a line of M pixels.

Such a configuration has the advantage of being simpler to implement.

The lines of the multiplexers for addressing the pixels can be such that one line for addressing the pixels comprises pixels of different rows.

This provides the possibility of avoiding visual artefacts by making light emitting elements of different rows light up simultaneously.

The lines of the multiplexers for addressing the pixels may also be such that at least two pixels in the same column are addressed by the same line.

This provides the possibility of further reducing visual artefacts by increasing the possibility to randomize the order in which light emitting elements light up during a cycle.

The order in which the multiplexers are addressed may advantageously not be linear. Such an addressing scheme may also further reduce visual artefacts.

Advantageously, the pixels are addressed several times during one frame.

This enables the reduction of visual artifacts.

Preferably, the colors of sub-pixels composing a pixel are at least red, green, blue, and may further comprise any one of red, green, blue, white, yellow, cyan, magenta or any other color.

This driving scheme is possible with any type of display. A current source may be provided for each type of sub-pixel, such that the driving can be adapted.

Preferably, the light emitting elements are any one of LEDs, OLED, and variations thereof, QD-LED, EL-QLED, AMOLED, mini-LED, micro-LED. The invention is not limited to a particular type of light emitting element, and the advantages provided can be beneficial to any type of light emitting element.

Advantageously, the light emitting elements are provided with quantum dots to generate the different colors of emission. Quantum dots have the advantage of improving the brightness of a display and can also improve the color points.

In another aspect there is provided a first chip configured to cooperate with the driver circuit defined above. The first chip preferably comprises N multiplexers, each multiplexer being configured to drive one line of M pixels, and the combination of multiplexers being configured to address all the pixels of the N×M matrix during one period of the signal, such as Pulse Width Modulated signal.

If a display module comprises a total of G light emitting modules, the number of lines P per display module will be divided in G groups of N lines such that G*N=P, each group having a unique set of current sources for red (R), green (G) and blue (B).

In another aspect there is provided a second chip configured to cooperate with the driver circuit defined above, wherein the second chip may further comprise one current source per color, or sub-pixel, to drive the N×M matrix. The current source is mirrored M times on the TFT layer and arranged in series with a switch, such as a PWM switch, provided in each of the M columns of the matrix.

In another aspect there is also provided a chip configured to cooperate with the driver circuit and comprising the first and second chips defined above.

In another aspect there is also provided a light emitting module comprising a matrix of N×M pixels, at least one driver circuit associated to said matrix as defined above, and for each driver circuit and associated matrix, a first and second chip or the combined chip, as defined above.

There is also provided a display module comprising at least one light emitting module.

There is also provided a tiled display comprising at least one display module.

BRIEF DESCRIPTION OF DRAWINGS

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DEFINITIONS AND ACRONYMS

Active Matrix.

Active matrix is a type of addressing scheme used in flat panel displays. In this method of switching individual elements (pixels), each pixel is attached to a transistor and capacitor actively maintaining the pixel state while other pixels are being addressed.

Figure 1:
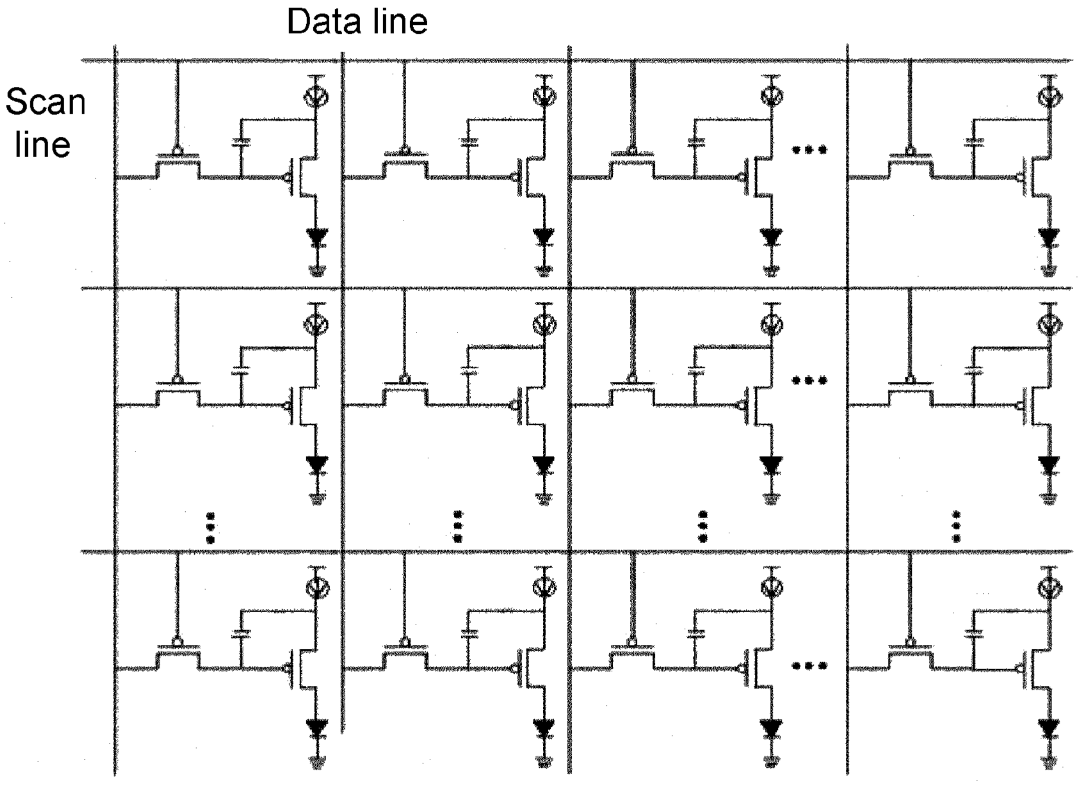
FIG. 1 shows an active matrix circuit according to the prior art.

Active-matrix circuits are commonly constructed with thin-film transistors (TFTs) in a semiconductor layer formed over a display substrate and employing a separate TFT circuit to control each light-emitting pixel in the display. The semiconductor layer is typically amorphous silicon, polycrystalline silicon and is distributed over the entire flat-panel display substrate. FIG. 1 shows a schematic representation of an active matrix. An active matrix display can also be for example an LCD or an electrophoretic reflective transmissive emitting display or similar.

A display sub-pixel can be controlled by one control element, and each control element includes at least one transistor. For example, in a simple active-matrix light-emitting diode display, each control element includes two transistors (a select transistor and a power transistor) and one capacitor for storing a charge specifying the luminance of the sub-pixel. Each LED element employs an independent control electrode connected to the power transistor and a common electrode. Control of the light-emitting elements in an active matrix known to the art is usually provided through a data signal line, a select signal line, a power or supply connection (referred to as e.g., VDD) and a ground connection.

Throughout the description of the present invention, active matrix refers to a functionality implemented in the TFT layer on the glass.

Backplane is a board comprising electronic components configured to drive the light emitting display. A backplane can be for example a PCB backplane, or a TFT backplane.

Carrier board refers to a board which is configured to receive at least one display module. It serves as a support structure of a tiled display. The carrier board can be a backplane or a mechanical support structure. It can also serve as a distribution panel for power, ground and to distribute driving signals for the light emitting elements.

Driving signals or data signals are the signals which comprise the information for driving the light emitting elements to generate an image on the display. Depending in which stage they are in the transmission flow, they may be digital signals, or analog signals, or optical pulse signals, etc.

Display

A display screen can be composed of light emitting pixel structures referred to as "display pixels" or "pixels" where the amount of display pixels determines the "display resolution", sometimes referred to as the "native display resolution" or the "native pixel resolution". A measure of the display resolution can be the total number of display pixels in a display, for example 1920×1080 pixels. Each display pixel can emit light in all colors of the display color gamut (i.e. the set of colors the display is able to provide).

Each display pixel can be composed of light emitting structures referred to as "sub-pixels", often being able to emit the colors red (R), green (G) or blue (B) (but also white, yellow or other colors are possible). A display pixel can be composed of at least three sub-pixels: One red, one green and one blue sub-pixel. Additionally, the display pixel can comprise other sub-pixels in any of the aforementioned colors (to further increase the color gamut). Depending on the types of sub-pixels, the display pixel can then be referred to as a RGB-, RGGB-, RRGB-pixel, etc. While a single display pixel can generate all colors of the display color gamut, a single sub-pixel cannot.

The light emission of a single sub-pixel can be controlled individually so that each display pixel can emit the brightness and color required to form the requested image. The distinction between display pixels and sub-pixels will be used consistently in this text.

Display module is a carrier configured to receive at least one light emitting module. The carrier of the display module is configured to transfer driving signals and power signals to the light emitting module.

A plurality of display modules can be placed on a bigger carrier board (mechanical interface) to create a tiled display and be connected to an external driver or the display module. The functionalities of the driver can also be embedded in the display module.

Duty Cycle The term duty cycle describes the proportion of 'on' time to the regular interval or 'period' of time; a low duty cycle corresponds to low power, because the power is off for most of the time. Duty cycle is expressed in percent, 100% being fully on.

LED. Light Emitting Diode

Light Emitting Element. A light emitting element can be e.g., a solid-state light emitting element, such as a light emitting diode such as an LED or an OLED (Organic LED).

Light Emitting Module

A light emitting module is an opto-mechanical-electronic carrier of a certain size which carries light emitting elements directed towards a viewer and possible light emitting elements driving and control electronics. These light emitting elements are driven to create an image, either static or dynamic (video). In the following the light emitting module will be called an "LED module", although the invention is not restricted to LEDs. Several LED modules or OLED modules can be positioned next to each other to form a display module. Several display modules can be tiled together to form a larger tiled display.

A small LED module which is an atomic element, i.e., indivisible, can be called a "stamp". The light emitting module can have any size and shape. It can be rectangular or square, hexagonal, triangular, any shape, if it fits in a pick and place robot used to place it on a display module. It can also comprise one pixel, which comprises a red, green, and blue LED.

The light emitting module comprises at least one backplane. The top surface of the backplane comprises the light emitting elements and associated conducting tracks which connect the various light emitting elements to various electronic components (like e.g., current drivers, power supply contacts etc.). The backplane can be a PCB, TFT on glass, TFT on PI, etc.

The following patent applications, from the same applicant, provide definitions of LED displays and related terms. These are hereby incorporated by reference for the definitions of those terms.

U.S. Pat. No. 7,972,032B2 "LED Assembly"

U.S. Pat. No. 7,176,861B2 Pixel structure with optimized subpixel sizes for emissive displays U.S. Pat. No. 7,450,085 Intelligent lighting module and method of operation of such an intelligent lighting module U.S. Pat. No. 7,071,894 Method of and device for displaying images on a display device.

MUX Multiplexer

PAM Pulse Amplitude Modulation

Figure 2:
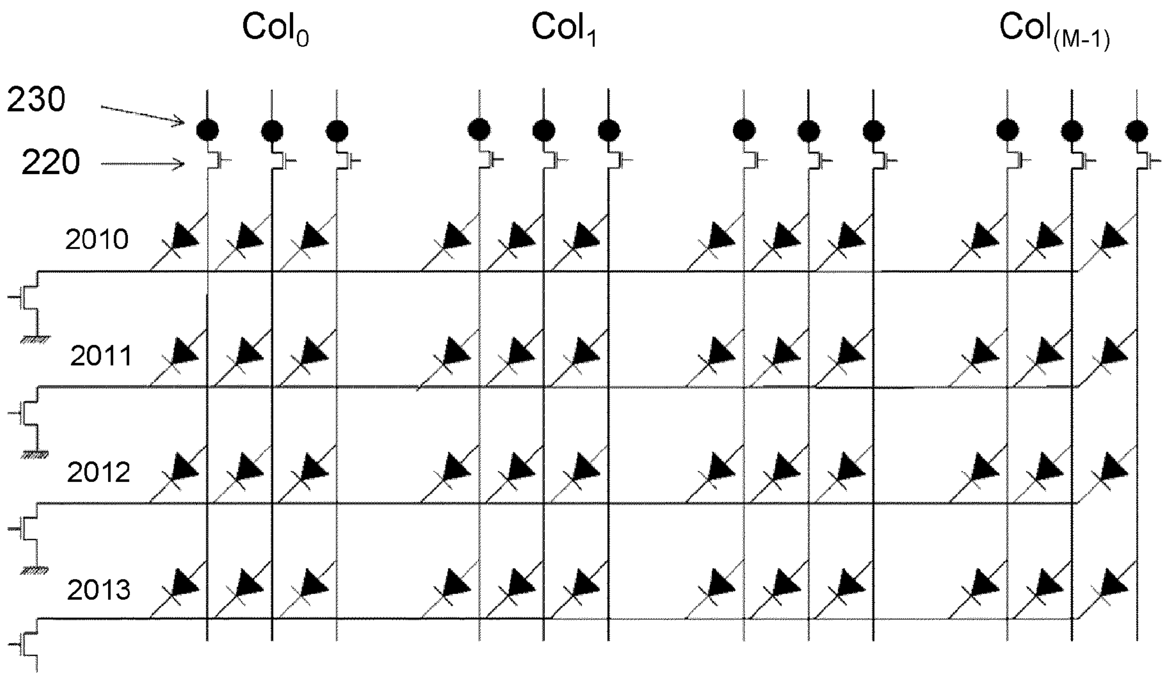
FIG. 2 shows a passive matrix circuit according to the prior art.

Passive Matrix (PM) Passive matrix addressing is an addressing scheme used in early LCDs. This is a matrix addressing scheme meaning that only m+n control signals are required to address an m×n display. A pixel in a passive matrix must maintain its state without active driving circuitry until it can be refreshed again. FIG. 2 shows a principle schematic of a passive matrix.

PWM Pulse Width Modulation

Pulse-width modulation uses a rectangular pulse wave whose pulse width is modulated resulting in the variation of the average value of the waveform. The square wave has a period T, a lower limit 10 (typically 0 in our case), a higher limit 11 and a duty cycle D. The duration of one pulse P (the time during which the signal is at its higher limit) is D/100*T (if D is expressed in %). For instance, if D=50%, the duration of the pulse is ½ T. A more complete definition can be found in WO2019185935A1 from the same applicant.

PWM Switch

PWM switch is a device configured to interrupt the driving source of a light emitting device in a time-modulated (PWM) mode.

Rds(on) Drain-source on-resistance is the resistance between drain and source with a specified VGS applied to bias the device to the on-state. The measurement is made in the ohmic (i.e., linear) region of the device. On the curve tracer the Collector Supply drives the drain and the Step Generator drives the gate.

TGV Through Glass Via

Thin-film technology refers to the use of thin films: A film a few molecules thick deposited on a glass, ceramic, or semiconductor substrate to form a capacitor, resistor, coil, cryotron, or other circuit component. A film of a material from one to several hundred molecules thick deposited on a solid substrate such as glass or ceramic or as a layer on a, supporting liquid.

DESCRIPTION OF EMBODIMENTS

Terminology used for describing particular embodiments is not intended to be limiting of the invention. As used herein, the singular forms “a”, “an” and “the” are intended to include the plural forms as well, unless the context clearly indicates otherwise. The term “and/or” includes any and all combinations of one or more of the associated listed items. It will be understood that the terms “comprises” and/or “comprising” specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. Where the term “comprising” is used in the present description and claims, it does not exclude other elements or steps.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The terms “about” or “approximate” and the like are synonymous and are used to indicate that the value modified by the term has an understood range associated with it, where the range can be +20%, +15%, +10%, +5%, or +1%. The term “substantially” is used to indicate that a result (e.g., measurement value) is close to a targeted value, where close can mean, for example, the result is within 80% of the value, within 90% of the value, within 95% of the value, or within 99% of the value.

As mini and micro-LEDs are determining the display trends of the future, there will be a high need for driving the LED matrix, either by Passive Matrix (PM), well known in current LED displays and driven by dedicated chips generating the Pulse Width Modulation (PWM) and Active Matrix (AM), well known in the LCD industry to be deployed on large area glass but using Analog drive, not suited for driving direct view LED displays.

Both systems provide advantages and disadvantages, but none offers a single solution for driving μLEDs.

PM has the advantage that the PWM is generated in driver chips with time-multiplexed driving of groups of LEDs, sharing the same current source.

AM has the advantage of integrating active components in the display substrate and sample-and-hold the incoming data by means of a scanline to the individual pixels. To generate PWM driven constant current, extra TFTs are needed in the pixels, which usually do not fit the available area in the active matrix.

In AM, the switching and the current source is usually implemented for each sub-pixel. However, this is not possible for micro-LEDs as the dimensions of the contact pads are drastically reduced.

The present invention provides means to combine the functionalities of AM and PM for driving light emitting elements, such as LEDs, and is particularly advantageous for driving mini- and micro-LEDs. It is possible to benefit from using shared current sources among the pixels and sample/hold the PWM value in the pixels. Sharing common resources, such as the current sources and the switching can provide the required space. This is made possible with the use of multiplexers, to be able to address each pixel individually. A current source for every individual pixel and a switching transistor for every individual pixel may not be needed anymore.

In the present invention, the active matrix is implemented on a TFT layer. The display pixels are composed of at least three sub-pixels provided by light emitting elements of different colors, the pixels being arranged in an N×M matrix. This active matrix may only represent a portion of a light emitting module, as described above.

Thus, several active matrices as described in the present specification may be implemented on a light emitting module.

The pixels of each N×M matrix on the TFT layer of the light emitting module will therefore share common resources and enable to reduce the number of contacts on the TFT layer. This will result in more space for implementing micro and mini-LEDs for example. This technology may also be beneficial to other types of light emitting elements.

FIG. 2 shows a simple N×M Passive Matrix pixel structure, according to the prior art. It comprises a matrix of N rows and M columns. In fact, in this example, each pixel is composed of three sub-pixels provided by light emitting elements, i.e., a red, green, and blue light emitting element, such as LEDs.

Pulse width modulation (PWM) driving can be used to achieve the gray scales in this passive matrix driving. A current source 230 is provided next to a PWM switch 220, in each column of the passive matrix. Each row comprises a time-multiplex switch, 2010 (Mux 0), 2011 (Mux 1), 2012 (Mux 2), 2013 (Mux N−1).

Since the active time of the LEDs is reduced proportionally to the number of multiplexers, the momentary light-output needs to be increased accordingly to end up with the same brightness in the given timeframe. This is achieved by increasing the pulsed current proportionally to the number of multiplexers.

The inventors have imagined implementing this driving scheme in an Active Matrix. To achieve good results, the following considerations need to be considered when implementing PM driving on an Active Matrix:

1) The current through each time-multiplex switch 2010, 2011, 2012, 2013 can be M-times the pixel current on this line. The currents from all light emitting elements arranged on one multiplexer line are combined and need to be switched on and off. This cannot be implemented on the TFT due to the high resistance when the switch is closed. Higher current flowing through results in power dissipation following Ohm’s law, $P=I^2Ron$. This further results in the appearance of hot spots on the panel. In addition, the voltage will gradually drop along the multiplexer line. Therefore, the switch should be implemented externally from the TFT active matrix, by side contacting and provided in the bottom, or on a PCB or integrated in a custom chip (ASIC).

This implies:

(a) a very strong TFT to switch. In fact, the drain source on resistance (Rds(on)) is not negligible.

(b) low resistance traces in this line to reduce the voltage drop, and thereby power losses.

2) The current sources for each individual column need to be as similar as possible to provide uniformity over the panel.
3) The driving frequency of the PWM switch increases linearly with the number of rows (or number of multiplexers).

Figure 3:
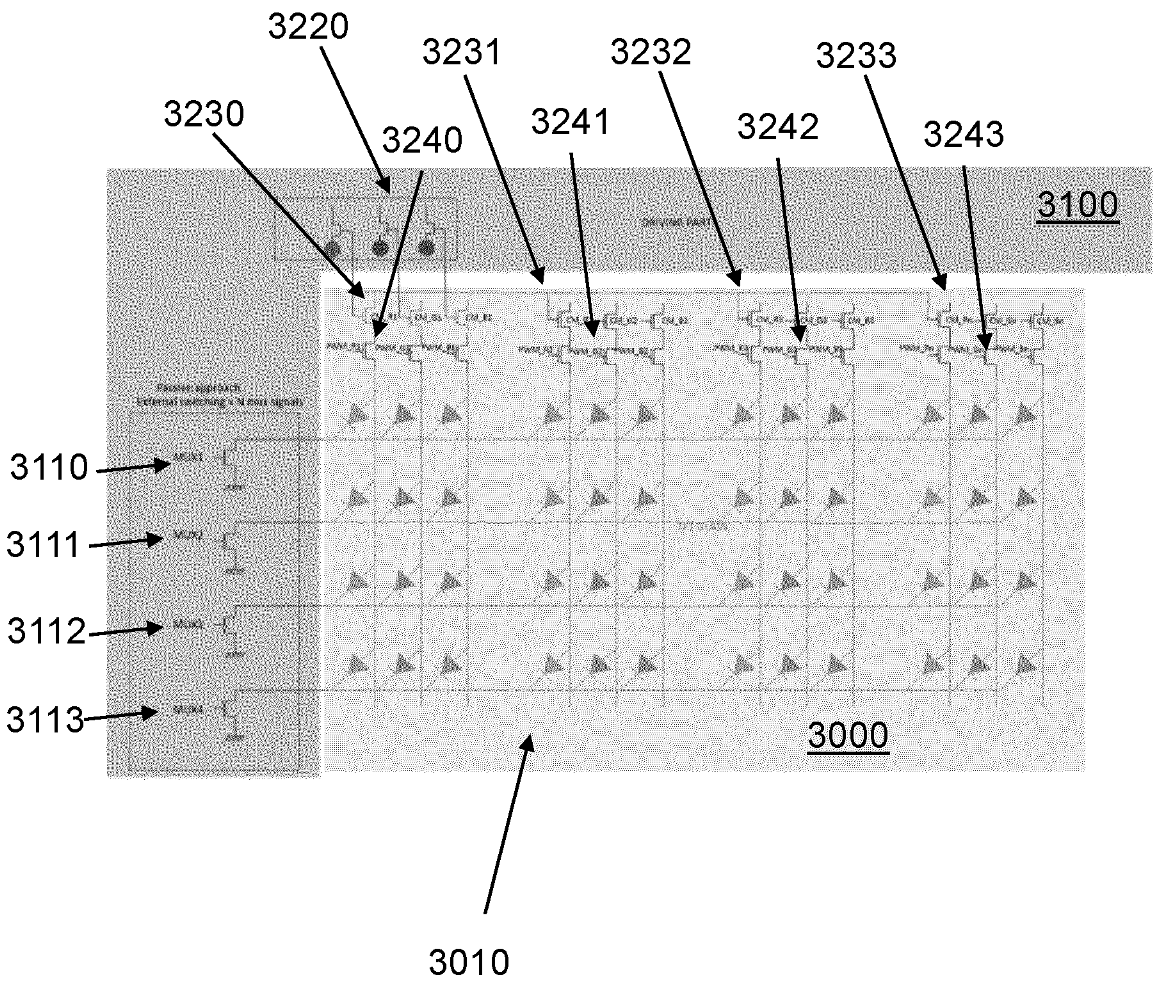
FIG. 3 shows a combined active/passive matrix circuit according to the present invention.

FIG. 3 illustrates an implementation of a possible driving scheme which combines the AM and PM driving functionalities while solving the above mentioned problems.

The driver circuit 3010 of the active matrix implemented on the TFT layer 3000 is configured to cooperate with N multiplexers 3110, 3111, 3112, 3113 provided for example in an external driver circuit 3100, each multiplexer being configured to drive for example one line of M pixels, and the combination of multiplexers being configured to address all the pixels of the N×M matrix during one period of the Pulse Width Modulated signal. In this example, N=M=4.

The driver circuit 3010 is further configured to cooperate with at least one external current source 3230 per color to drive the N×M matrix, said current source 3220 being mirrored M times 3230, 3231, 3232, 3233 on the active matrix and arranged in series with a PWM switch 3240, 3241, 3242, 3243 provided in each of the M columns of the active matrix.

In FIG. 3, each multiplexer 3110, 3111, 3112, 3113 is thus external to the active matrix. For example, it can be provided on a PCB arranged under the active matrix, or in a PCB arranged on top of the active matrix, with cavities provided at the locations of the light emitting elements. It can also be implemented in a PCB provided in the back and connected to the active matrix by side contacts. The multiplexers may further also be implemented on a chip.

In addition, the current sources are also provided by an external circuit 3100, which may be the same as the one comprising the multiplexers or a different one. They can thus be provided by a second backplane, or also implemented on a PCB provided in the back and connected to the active matrix by side contacts. The current sources may also be implemented on a chip.

It is also possible to combine the implementation of the external multiplexers and external current sources in a same chip. This chip could then be implemented in the second backplane and connections to the N×M pixels made via through holes in the PI, provided under the TFT, or by side contacting.

With this driving scheme, instead of providing one current source per pixel, as is the case in AM driving, one current source is shared among several (N) pixels.

In addition, current mirroring is implemented on the TFT with a current mirror transistor per type of light emitting element (color) or per sub-pixel. Copying the incoming reference current to each light emitting element column is done by the pulse width modulation switch 3240, 3241, 3242, 3243, thereby interrupting the current during the dutycyle of each of the N time-multiplexers 3110, 3111, 3112, 3113. Sharing current sources has the advantage of reducing the panel-overhead.

Current mirrors are a technique commonly used in semiconductors, either in chips or TFT backplanes. The principle is that a current reference is 'mirrored' to the application to provide a multitude of the same current-source available to feed different circuitry.

Besides mirroring, it is also possible to reduce or increase the current in a determined ratio, defined by design-parameter (so called W/L ratio in TFT terms). The advantage is that multiple 'slave' MOSFETs can be connected in parallel to the same reference voltage "Vref", resulting in a multitude of current sources, copied from the same source. By changing the source, the base current can be easily set for a complete panel.

In addition, since each column of light emitting elements needs a current source, an external connection to a source for each column is not needed anymore, but a copy in each column to the same source. It is thus desirable to keep the reference voltage Vref stable over the entire panel. This Vref can be referenced as GND (current sink) or to Vdd (current source). It is thus desirable to keep the voltage drop minimal over the panel to keep the current constant over the panel.

The current to be fed in this AM/PM combined mode corresponds to the current needed to achieve the desired brightness in AM mode, multiplied by N (number of time-multiplexers), as each light emitting element in only on 1/Nth of the time. However, as the current is provided by an external circuit, the resistance Rds(on) is lower than in a TFT. Heating may thus be avoided and the appearance of hot spots throughout the panel are also avoided.

By combining PWM and time-multiplexing, a group of N×M pixels is driven together and share common driving functionalities. Thus, if each pixel comprises three sub-pixels, each group of N×M pixels is driven by a set of M×3 PWM inputs to the switches and N inputs to the mux-switches which results in a total of (M×3)+N contacts to be made on the panel.

Typically, PM drivers can drive 16 RGB pixels with 16 time-multiplexers (muxes), resulting in 16×16=256 pixel. The number of connections for every chip comprises then 3×16+16=64 contacts.

With this AM/PM approach, the number of contacts is not limited. Since all the 'analog' functions are incorporated in the light emitting module (e.g. current sources & PWM switch), only the digital functions remain in the light emitting module and the module can be driven by digital drivers (i.e. programmable logic) and does not require the use of mixed signal chips. The multiplexers have the width of a panel wide, contrary to PM which are limited to a part of a line.

The advantages of this combined driving scheme are the following:

1) By providing the MUX switches outside of the AM domain, it is possible to implement each multiplexer (MUX) with a low Rds(on) FETs, which are available in small chip packages.
2) There is only one current source for a group of M×N sub-pixels.
3) The PWM switch is driving the back gate of the current mirror on the TFT (which excludes a second TFT in series. It results in the application of a lower power.)
4) The current mirrors can be shared among N rows (but need to be N-times higher due to the N time-multiplexers)

However, increasing the drive current has the advantage of driving the LED in the linear section of the I-V curve.

5) The Mux-line can be routed in an external layer of Cu between the pixels or connected by an extra top layer PCB.

While this solution provides many advantages, there are also some drawbacks. For example, time multiplexing may cause visual artifacts since only 1/Nth of the pixels are simultaneously on at one moment in time. These visual artifacts may however be reduced by changing the arrangements of the driving lines of the multiplexers. For example, one line of a multiplexer could address pixels which are arranged in different columns also in different rows, or address only pixels of certain columns and certain rows, etc.

Figure 4:
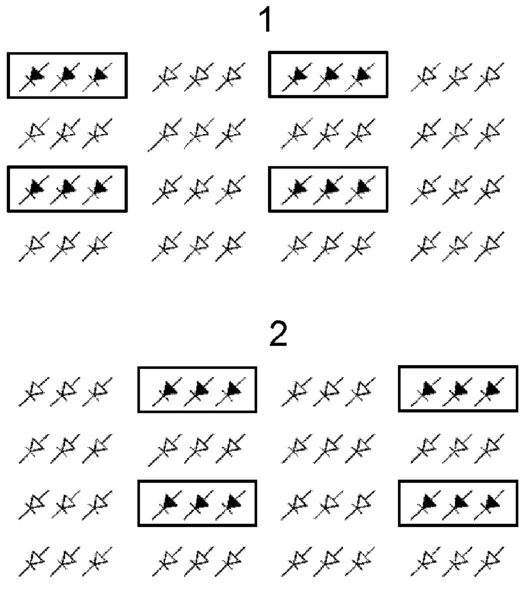
FIG. 4 illustrates the implementation of mux-scrambling.

FIG. 4 shows the pixels of a 4 by 4 matrix being addressed at each sequence of a full cycle comprising a total of 4 sequences (N=4). Each pixel is composed of red, green and a blue sub-pixel, or light emitting element. The pixels addressed at each sequence are encircled in the rectangles. Thus, instead of providing a row-by-row addressing scheme, the pixels in each 2×2 sub-matrix, are addressed following a rotational order in the cycle, i.e., Sequence 1: (row1, col1), Sequence 2: (row1, col2), Sequence 3: (row2, col2), Sequence 4: (row2, col1)).

Other addressing schemes are of course possible. Any random order in addressing the pixels in the rows or in the columns may be provided.

Each multiplexer of the N multiplexers may, instead of being on following the order of the rows, be on following a random order or a special sequence.

Figure 5A:
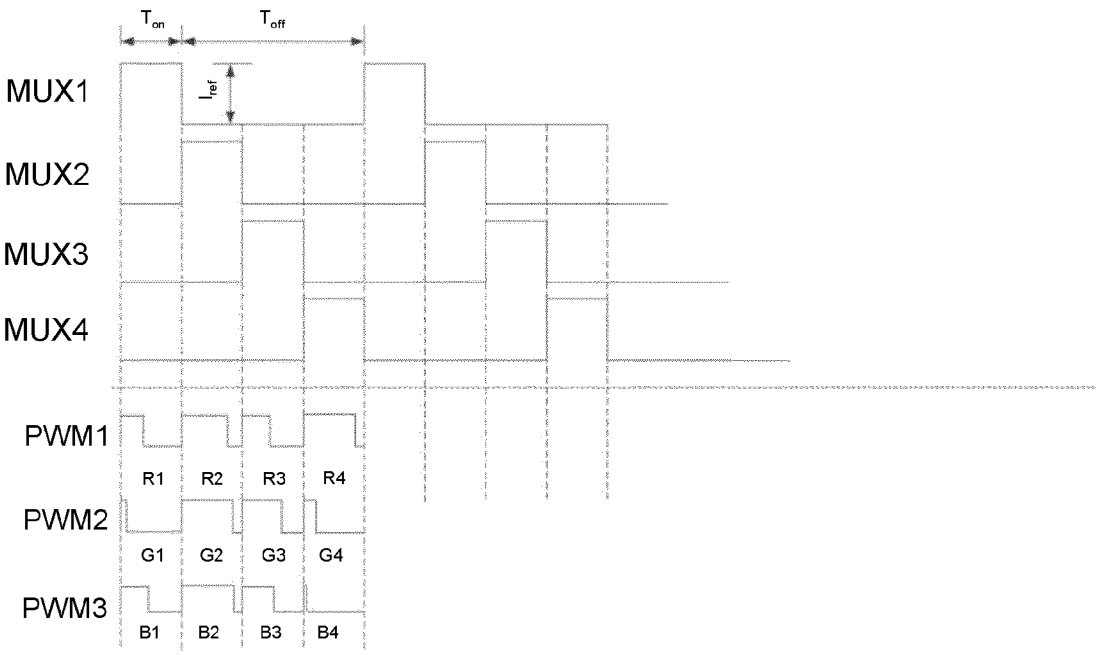
FIG. 5A is a schematic representation illustrating a PWM driving scheme wherein multiplexers are arranged to address pixels of different columns in different rows.
Figure 5B:
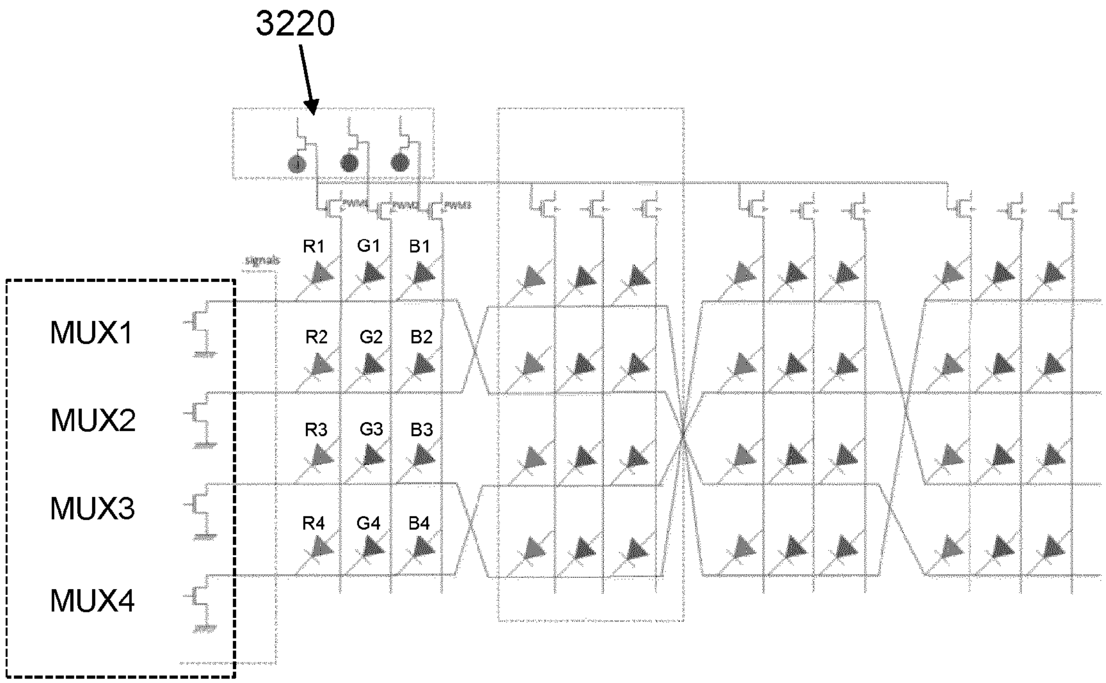
FIG. 5B is a combined active and passive matrix as shown in FIG. 3, with the implementation of the driving scheme of FIG. 5A and wherein the lines of the multiplexers are arranged differently than the rows.

FIGS. 5A and 5B illustrate a possible PWM driving scheme wherein multiplexers are arranged to address pixels of different columns in different rows. All the light emitting elements connected to one multiplexer are active at each sequence of the four sequences illustrated in the example.

The light emitting elements of a same color or type are arranged in a same column and are connected to a same Pulse Width modulation switch such that light emitting elements R1, R2, R3 and R4 receive signal PWM1. R1, R2, R3 and R4 are all connected to a different multiplexer and all four light emitting elements are thus not active simultaneously.

FIG. 5B is almost identical to FIG. 3, although all references are not shown in FIG. 5B. For example, current source 3220 is mirrored four times on the active matrix.

In FIG. 5B, MUX1 addresses the pixels in (row1, col1), (row2, col2), (row3, col3) and (row4, col4). MUX2 addresses pixels of (row2, col1), (row1, col2), (row4, col3), and (row1, col4), etc.

As shown in FIG. 5A, during time Ton, the MUX switch is closed and connects all LEDs, connected on this line to the GND, enabling the current to flow through these LEDs.

A second control on the LED provided by the PWM switch is used during this time to generate the PWM signal. Thus, there is only a part of the LEDs which are active at one moment in time which could result in visual artefacts. By increasing the cycle time (=N*(Ton+Toff)) this effect can be minimized.

On top of that, the active LEDs per MUX do not have to be arranged in a single line but these can be rearranged differently over the panel, as already discussed above. It will of course make the connections more complex since the MUX preferably follows a row/column arrangement wherein at each crossing a LED can be connected.

Therefore, Providing External Multiplexer Switches can
- enable to provide more light emitting elements on one multiplexer row
- reduce power consumption due to low Rds(on) of the multiplexer switch compared to TFTs,
- free up space in the AM pixel for other functionality.

Providing Shared Current Sources can
- Reduce the occupied space in the active matrix pixels.
- Increase the driving current to the linear area of the LED I-V curve
- Reduce the number of driving signals to the pixels.
- Reduce the number of driver chips since this can be implement in the AM glass.

The Backgate Driving can
- reduce power in the panel thanks to the combination of PWM switch and current mirror. In fact, combining PWM switch with current mirror results in two separate switches for each row, thereby further reducing power losses.
- Reduce the number of TFTs in the pixel.

Each pixel is usually composed of three sub-pixels, a red, green, and blue sub-pixel. These are usually embedded by three LEDs of a different color for example, or with quantum dots.

The colors of sub-pixels composing a pixel are at least red, green, blue, and may further comprise any one of red, green, blue, white, yellow, cyan, magenta or any other color. However, a pixel may also comprise additional sub-pixels, such as an additional red, green, or blue sub-pixel, or even an additional yellow, or white pixel, or even, cyan or magenta.

Usually, the current source may be provided for each sub-pixel composing a pixel. Thus, if a pixel is composed of four sub-pixels, e.g., red, green, green, blue, then four current sources may be provided for each sub-pixel and may be mirrored M times in the N×M active matrix group of pixels.

While the invention has been illustrated and described mostly in reference to LEDs or micro LEDs, the invention is not limited thereto, and may also be advantageous for other the types of light emitting elements, such as of LEDs, OLED, and variations thereof, QD-LED, EL-QLED, AMO-LED, mini-LED, micro-LED.

The driver circuit described in the present disclosure may also be used for driving other elements or components than light emitting elements. In fact, this driving scheme provides many advantages which are applicable in other fields. For example, instead of the light emitting elements, other types of sensors, such as for example photometers can be used.

It will be appreciated that various modifications may be made to the embodiments hereinbefore described. Such modifications may involve equivalent and other features which are already known in the design, manufacture and use of the driver circuit and the various chips and component parts thereof and which may be used instead of or in addition to features already described herein. Features of one embodiment may be replaced or supplemented by features of another embodiment.

The invention claimed is:

1. A driver circuit for driving a matrix of N×M pixels of a light emitting module,
- wherein each pixel is composed of at least three types of light emitting elements, the light emitting elements being driven by a modulation control signal of period T configured to switch the light emitting elements on and off at most during 1/Nth of the period T,
- wherein the period T corresponds to the duration of a frame, and
- wherein the driver circuit is embedded in a thin-film transistor (TFT) layer such that a switch is embedded in each light emitting element, and is configured to cooperate with N multiplexers provided in an external driver circuit, each multiplexer being configured to drive a respective line of M pixels, and the combination of multiplexers is configured to address all the pixels of the N×M matrix during one period of the modulation control signal, and
- each pixel of a group of M pixels is shown consecutively during at most 1/Nth of the period T,
- at least one external current source per type of light emitting element to drive the N×M matrix, and wherein each external current source is mirrored M times on the TFT layer of the driver circuit and is arranged in series with a modulation control signal switch for generating the modulation control signal provided for each of the M columns of the matrix.

2. The driver circuit according to claim 1 wherein the modulation control signal is a pulse width modulation signal, and the modulation control signal switch is a pulse width modulation switch.

3. The driver circuit according to claim 1, wherein the three types of light emitting elements emit a different color, wherein the different colors are at least red, green, and blue.

4. The driver circuit according to claim 1, wherein the external current sources are provided on a printed circuit board (PCB) arranged under the matrix.

5. The driver circuit according to claim 1, wherein the multiplexers are provided on a printed circuit board (PCB) arranged under the matrix.

6. The driver circuit according to claim 1, wherein the multiplexers are transistors implemented with a low drain-source on-resistance field effect transistor (Rds(on) FET).

7. The driver circuit according to claim 1, wherein the lines of the multiplexers for addressing the pixels are such that one line for addressing the pixels comprises pixels of different rows.

8. The driver circuit according to claim 1, wherein the lines of the multiplexers for addressing the pixels are such that at least two pixels in the same column are addressed by the same line.

9. The driver circuit according to claim 1, wherein the order in which the multiplexers are addressed is not linear.

10. The driver circuit according to claim 1, wherein the pixels are addressed several times during one frame.

11. The driver circuit according to claim 1, wherein colors of sub-pixels composing a pixel are at least red, green, blue, and may further comprise any one of red, green, blue, white, yellow, cyan, magenta or any other color.

12. The driver circuit according to claim 1, wherein the light emitting elements are any one of light-emitting diodes (LEDs), organic light-emitting diodes (OLEDs), quantum dot light-emitting diodes (QD-LEDs), electroluminescent quantum light-emitting diodes (EL-QLEDs), active-matrix organic light-emitting diodes (AMOLEDs), mini-LEDs, micro-LEDs.

13. The driver circuit according to claim 1, wherein the light emitting elements are provided with quantum dots to generate the different colors of emission.

14. A chip configured to cooperate with the driver circuit of claim 2, the chip comprising N multiplexers, each multiplexer being configured to drive one line of M pixels, and the combination of multiplexers being configured to address all the pixels of the N×M matrix during one period of the Pulse Width Modulated signal.

15. A chip configured to cooperate with the driver circuit of claim 1, the chip comprising one current source per sub-pixel to drive the N×M matrix, said current source being mirrored M times on the TFT layer and arranged in series with a PWM switch provided in each of the M columns of the matrix.

16. A chip configured to cooperate with the driver circuit and comprising the chip of claim 14 and a chip comprising one current source per sub-pixel to drive the N×M matrix, said current source being mirrored M times on the thin-film transistor (TFT) layer and arranged in series with a pulse width modulation (PWM) switch provided in each of the M columns of the matrix.

17. A light emitting module comprising a matrix of N×M pixels, at least one driver circuit associated to said matrix according to claim 1, and for each driver circuit and associated matrix, a chip configured to cooperate with the driver circuit, the chip comprising N multiplexers, each multiplexer being configured to drive one line of M pixels, and the combination of multiplexers being configured to address all the pixels of the N×M matrix during one period of the Pulse Width Modulated signal and a chip configured to cooperate with the driver circuit, the chip comprising one current source per sub-pixel to drive the N×M matrix, said current source being mirrored M times on the thin-film transistor (TFT) layer and arranged in series with a pulse width modulation (PWM) switch provided in each of the M columns of the matrix.

18. A display module comprising at least one light emitting module according to claim 17.

19. A tiled display comprising at least one display module according to claim 18.

* * * * *